(12) United States Patent
Hirohata

(10) Patent No.: US 8,145,486 B2
(45) Date of Patent: Mar. 27, 2012

(54) INDEXING APPARATUS, INDEXING METHOD, AND COMPUTER PROGRAM PRODUCT

(75) Inventor: Makoto Hirohata, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1112 days.

(21) Appl. No.: 12/007,379

(22) Filed: Jan. 9, 2008

(65) Prior Publication Data

US 2008/0215324 A1    Sep. 4, 2008

(30) Foreign Application Priority Data

Jan. 17, 2007   (JP) ................................ 2007-007947

(51) Int. Cl.
*G10L 17/00* (2006.01)
(52) U.S. Cl. ........ 704/247; 704/245; 704/246; 704/248; 704/249; 704/250
(58) Field of Classification Search ........................ None
See application file for complete search history.

(56) References Cited

U.S. PATENT DOCUMENTS

| | | | |
|---|---|---|---|
| 5,742,928 A | 4/1998 | Suzuki | |
| 5,864,809 A | 1/1999 | Suzuki | |
| 6,119,084 A | 9/2000 | Roberts et al. | |
| 6,185,527 B1 | 2/2001 | Petkovic et al. | |
| 6,317,711 B1 | 11/2001 | Muroi | |
| 6,434,520 B1 | 8/2002 | Kanevsky et al. | |
| 6,542,869 B1 | 4/2003 | Foote | |
| 6,577,999 B1 | 6/2003 | Lewis et al. | |
| 6,961,703 B1 | 11/2005 | Higgins et al. | |
| 7,065,487 B2 | 6/2006 | Miyazawa | |
| 7,396,990 B2 | 7/2008 | Lu et al. | |
| 2002/0046024 A1 | 4/2002 | Kompe et al. | |
| 2003/0216918 A1 | 11/2003 | Toyama et al. | |
| 2004/0249650 A1* | 12/2004 | Freedman et al. ................. 705/1 |
| 2005/0075875 A1* | 4/2005 | Shozakai et al. ............... 704/231 |
| 2006/0058998 A1 | 3/2006 | Yamamoto et al. | |
| 2006/0101065 A1 | 5/2006 | Tsutsui et al. | |
| 2006/0129401 A1 | 6/2006 | Smith et al. | |
| 2006/0241948 A1 | 10/2006 | Abrash et al. | |
| 2007/0033042 A1 | 2/2007 | Marcheret et al. | |
| 2008/0312926 A1* | 12/2008 | Vair et al. ...................... 704/249 |

FOREIGN PATENT DOCUMENTS

| | | |
|---|---|---|
| JP | 04-084197 | 3/1992 |
| JP | 06-012090 | 1/1994 |
| JP | 08-054891 | 2/1996 |
| JP | 2001-290494 | 10/2001 |
| JP | 2006-084875 | 3/2006 |

OTHER PUBLICATIONS

Moh et al., "Towards Domain Independent Speaker Clustering," Proc. IEEE-ICASSP, vol. 2, (2003), pp. II-85-II-88. Office Action dated Jan. 11, 2011 in Japanese Patent Application No. 2007-007974 and English-language translation thereof.
Delacourt et al., "DISTBIC: a speaker based segmentation for audio data indexing", Speech Communication, 2000, pp. 111-126.
Li et al., "SVM-Based Audio Classification for Instructional Video Analysis", IEEE-ICASSP, 2004, pp. 897-900.
Yamamoto et al., U.S. Appl. No. 11/202,155, filed Aug. 12, 2005.

* cited by examiner

*Primary Examiner* — Leonard Saint Cyr
(74) *Attorney, Agent, or Firm* — Nixon & Vanderhye, P.C.

(57) ABSTRACT

Acoustic models to provide features to a speech signal are created based on speech features included in regions where similarities of acoustic models created based on speech features in a certain time length are equal to or greater than a predetermined value. Feature vectors acquired by using the acoustic models of the regions and the speech features to provide features to speech signals of second segments are grouped by speaker.

11 Claims, 13 Drawing Sheets

INDEXING APPARATUS, INDEXING METHOD, AND COMPUTER PROGRAM PRODUCT

CROSS-REFERENCE TO RELATED APPLICATIONS

This application is based upon and claims the benefit of priority from the prior Japanese Patent Application No. 2007-007947, filed on Jan. 17, 2007; the entire contents of which are incorporated herein by reference.

BACKGROUND OF THE INVENTION

1. Field of the Invention

The present invention relates to an indexing apparatus, an indexing method, and a computer program product that allocates an index to a speech signal.

2. Description of the Related Art

Speaker indexing (hereinafter, "indexing") has been used to assist viewing of and listening to multiple speakers at conferences, TV or radio programs, panel discussions, etc. Indexing is a technology that allocates indexes to relevant portions of a speech signal representative of an utterance of a speaker. The index includes speech information, such as who made the utterance, when and how long the utterance was made. Such indexing is helpful in various ways. For example, it facilitates searching an utterance of a particular speaker, and detecting a time period during which the particular speaker made active discussion.

When performing the indexing, a speech signal is subdivided into numerous smaller strings, strings having the same or similar characteristic feature are grouped into a longer segment, and a segment is considered as an utterance of one speaker. JP-A 2006-84875 (KOKAI), for example, discloses a technique for calculating the characteristic feature. Concretely, JP-A 2006-84875 (KOKAI) teaches creating an acoustic model representative of speech features from each of the segments that are created by subdividing a speech signal. Subsequently, for each acoustic model, a likelihood is acquired for detecting a similarity of each subdivided speech signal. Then, a vector including the likelihood as a component is used as an index that indicates a speech feature of the speech signal. Accordingly, utterances of the same speaker have a high likelihood with respect to a specific acoustic model, so that similar vectors are obtained from such utterances. In other words, if the vectors are similar, it means that those vectors have originated from the same speaker.

However, in the technology described in JP-A 2006-84875 (KOKAI) there is a problem that when the speech signals used to create acoustic models include utterances of multiple speakers, the utterances of different speakers erroneously sometimes indicate a high likelihood with respect to a common acoustic model. In this case, a feature is provided (vector is created) improperly to distinguish utterances of different speakers, with the result that indexing accuracy is degraded.

SUMMARY OF THE INVENTION

According to an aspect of the present invention, there is provided an indexing apparatus including an extracting unit that extracts in a certain time interval, from among speech signals including utterances of a plurality of speakers, speech features indicating features of the speakers; a first dividing unit that divides the speech features into a plurality of first segments each having a certain time length; a first-acoustic-model creating unit that creates a first acoustic models for each of the first segments based on the speech features included in the first segments; a similarity calculating unit that sequentially groups a certain number of successive first segments into a region, and that calculates a similarity between regions based on first acoustic models of the first segments included in those regions; a region extracting unit that extracts a region having a similarity that is equal to or greater than a predetermined value as a learning region; a second-acoustic-model creating unit that creates, for the learning region, a second acoustic model based on speech features included in the learning region; a second dividing unit that divides the speech features into second segments each having a predetermined time length; a feature-vector acquiring unit that acquires feature vectors specific to the respective second segments, using the second acoustic model of the learning region and speech features of the second segments; a clustering unit that groups speech features of the second segments corresponding to the feature vectors, based on vector components of the feature vectors; and an indexing unit that allocates, based on a result of grouping performed by the clustering unit, relevant portions of the speech signals with speaker information including information for grouping the speakers.

According to another aspect of the present invention, there is provided a method of indexing including extracting in a certain time interval, from among speech signals including utterances of a plurality of speakers, speech features indicating features of the speakers; dividing the speech features into a plurality of first segments each having a certain time length; creating a first acoustic models for each of the first segments based on the speech features included in the first segments; sequentially grouping a certain number of successive first segments into a region; calculating a similarity between regions based on first acoustic models of the first segments included in the region; extracting a region having a similarity that is equal to or greater than a predetermined value as a learning region; creating, for the learning region, a second acoustic model based on speech features included in the learning region; dividing the speech features into second segments each having a predetermined time length; acquiring feature vectors specific to the respective second segments, using the second acoustic model of the learning region and speech features of the second segments; clustering speech features of the second segments corresponding to the feature vectors, based on vector components of the feature vectors; and allocating, based on a result of grouping performed at the clustering, relevant portions of the speech signals with speaker information including information for grouping the speakers.

A computer program product according to still another aspect of the present invention causes a computer to perform the method according to the present invention.

DETAILED DESCRIPTION OF THE INVENTION

Exemplary embodiments of the present invention will be described below in detail with reference to the accompanying drawings.

Figure 1:
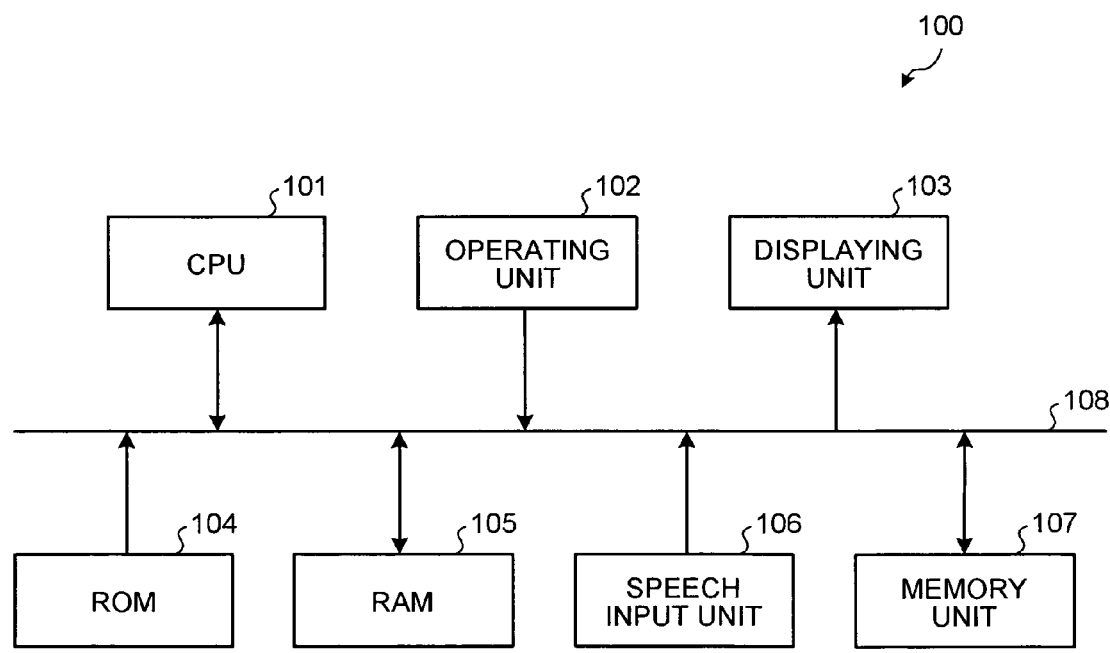
FIG. 1 is a schematic diagram of a hardware structure of an indexing apparatus according to a first embodiment of the present invention.

FIG. 1 is a block diagram of a hardware structure of an indexing apparatus 100 according to a first embodiment of the present invention. The indexing apparatus 100 includes a central processing unit (CPU) 101, an operating unit 102, a displaying unit 103, a read only memory (ROM) 104, a random access memory (RAM) 105, a speech input unit 106, and a memory unit 107, all of which are connected to a bus 108.

The CPU 101 uses a predetermined area of the RAM 105 as a work area, and executes various processings in cooperation with various control computer programs previously stored in the ROM 104. The CPU 101 centrally controls operations of all the units included in the indexing apparatus 100.

Figure 2:
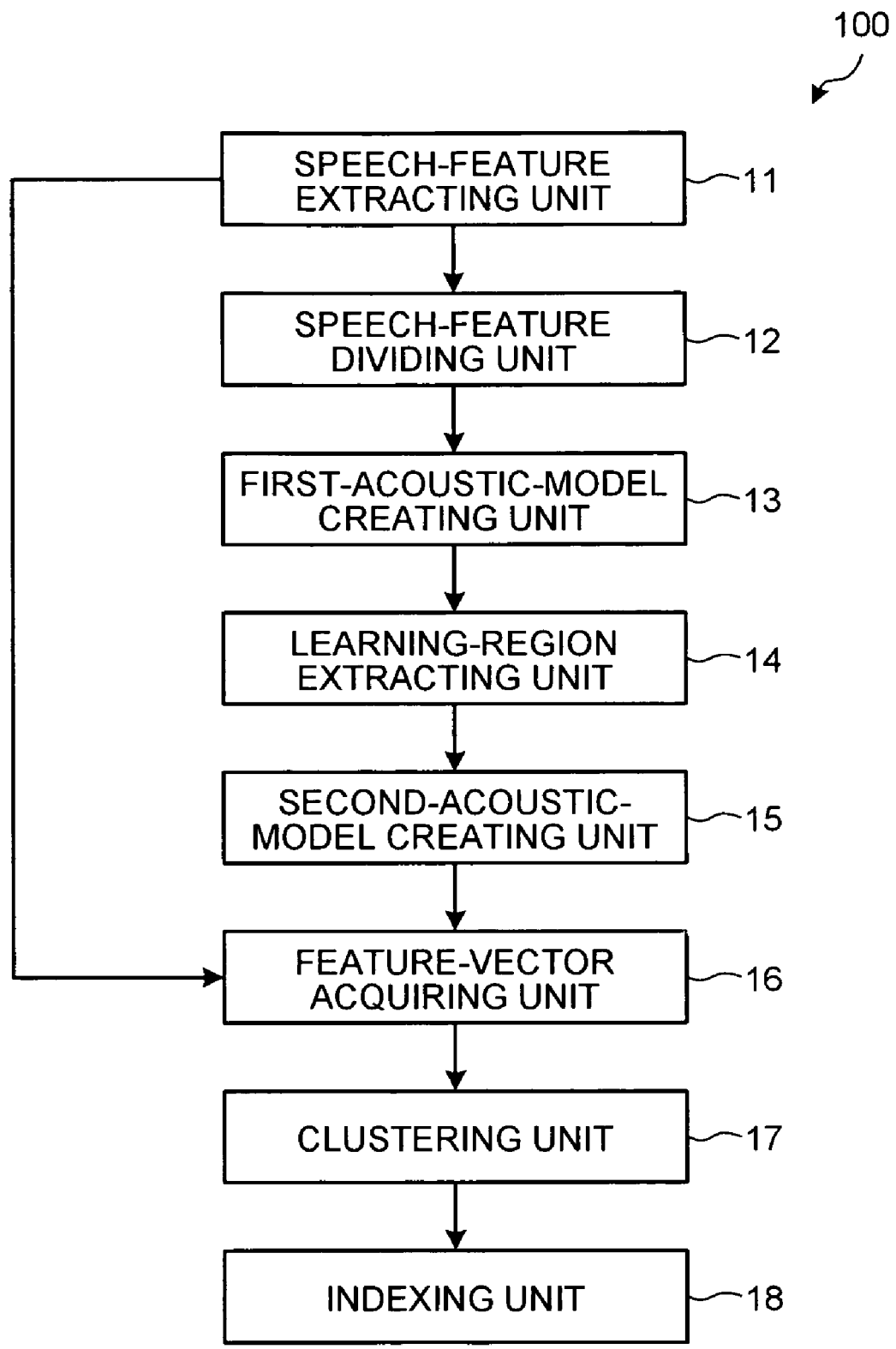
FIG. 2 is a schematic diagram of a functional configuration of the indexing apparatus shown in FIG. 1.

FIG. 2 is a schematic diagram of a functional configuration of the indexing apparatus 100. The CPU 101 realizes, in cooperation with predetermined computer programs previously stored in the ROM 104, functions of a speech-feature extracting unit 11, a speech-feature dividing unit 12, a first-acoustic-model creating unit 13, a learning-region extracting unit 14, a second-acoustic-model creating unit 15, a feature-vector acquiring unit 16, a clustering unit 17, and an indexing unit 18 shown in FIG. 2. These function units and their operations will be described in detail later.

The operating unit 102 includes various input keys. When a user enters information by operating those input keys, the operating unit 102 passes the entered information to the CPU 101.

The displaying unit 103, constituted by a display apparatus such as a liquid crystal display (LCD), displays various kinds of information based on display signals from the CPU 101. A touch panel can be used to realize the operating unit 102 and the displaying unit 103.

The ROM 104 stores therein various computer programs and configuration information in a non-rewritable manner. The CPU 101 uses the computer programs and the configuration information stored in the ROM 104 to control the indexing apparatus 100.

The RAM 105 is a storage medium such as a synchronous dynamic random access memory (SDRAM), and it functions as a work area of the CPU 101. Moreover, the RAM 105 serves as a buffer.

The speech input unit 106 converts an utterance of a speaker into electric signals, and sends them as speech signals to the CPU 101. The speech input unit 106 can be a microphone and any other sound collector.

The memory unit 107 includes a magnetically or optically recordable storage medium. The memory unit 107 stores therein data of speech signals obtained via the speech input unit 106 and data of speech signals entered via other source such as a communicating unit and an interface (I/F) (both not shown), for example. Further, the memory unit 107 stores therein speech signals that are provided with a label (index) in an indexing process described later.

As shown in FIG. 2, the indexing apparatus 100 includes the speech-feature extracting unit 11, the speech-feature dividing unit 12, the first-acoustic-model creating unit 13, the learning-region extracting unit 14, the second-acoustic-model creating unit 15, the feature-vector acquiring unit 16, the clustering unit 17, and the indexing unit 18.

From the input speech signals, the speech-feature extracting unit 11 extracts speech features indicating speakers' features in a certain interval of a time length $c_1$, and outputs the extracted speech features to the speech-feature dividing unit 12 and the feature-vector acquiring unit 16. Cepstrum features such as LPC cepstrum or MFCC cepstrum can be considered as the speech features. Moreover, the speech features can be extracted in the certain interval of the time length $c_1$ from the speech signals within a certain time length $c_2$, where $c_1<c_2$. Concretely, $c_1$ can be set to 10.0 milliseconds and $c_2$ can be set to 25.0 milliseconds.

The speech-feature dividing unit 12 divides the speech features, which it has received from the speech-feature extracting unit 11, into a plurality of first segments each having a fixed time length $c_3$. The speech-feature dividing unit 12 then outputs speech features and time information (start time and end time) of each of the first segments to the first-acoustic-model creating unit 13. For example, the time length $c_3$ is set to be shorter (e.g., 2.0 milliseconds) than the shortest time duration of an utterance that a person can make. If the time duration is set in this manner, then it can be assumed that each of the first segments includes speech features of only one speaker.

The first-acoustic-model creating unit 13, every time when it receives the speech features of a first segment from the speech-feature dividing unit 12, creates an acoustic model, i.e., a first acoustic model, based on the speech features. The first-acoustic-model creating unit 13 then outputs to the learning-region extracting unit 14 the created first acoustic model and specific information (speech features and time information) of the first segment used to create the first acoustic model. When the time length $c_3$ is set shorter than the shortest time duration of an utterance a person can make, it is preferable to create the acoustic model by using a vector quantization (VQ) codebook.

The learning-region extracting unit 14, when it receives the first segments from the first-acoustic-model creating unit 13, sequentially gathers a certain number of the first segments as one region. The learning-region extracting unit 14 then calculates a similarity between each of the region based on the first acoustic models of the first segments within the region. Moreover, the learning-region extracting unit 14 extracts, as a learning region, all the regions having the similarity equal to or greater than a predetermined value, and outputs to the second-acoustic-model creating unit 15 the extracted learning region and specific information of this model learning region (speech features and time information of the learning region).

Figure 3:
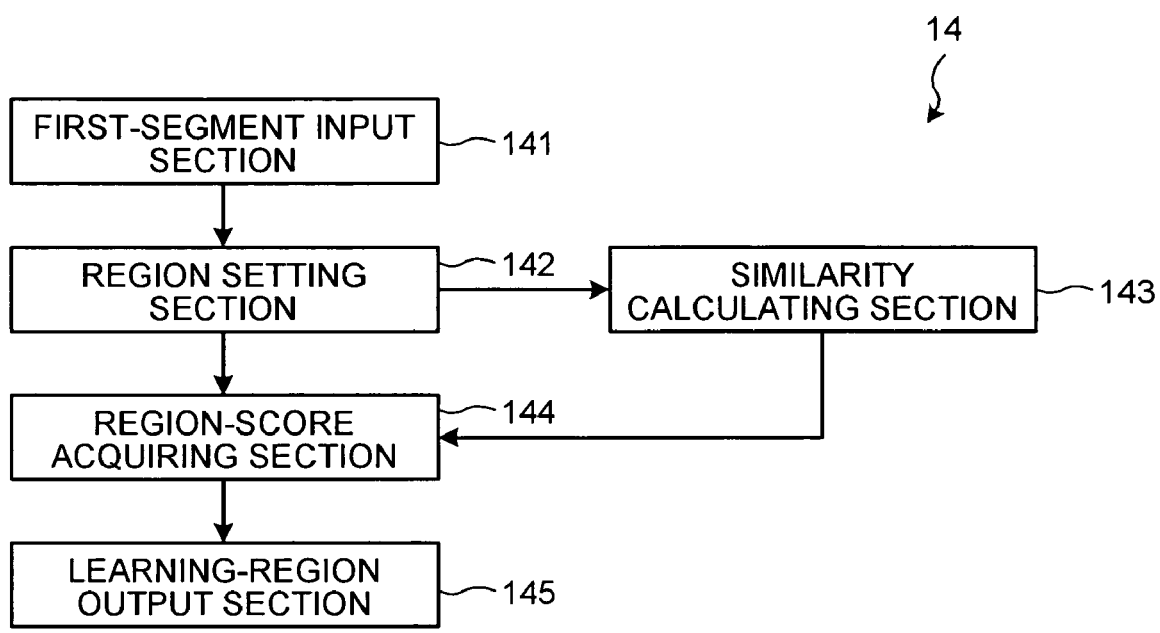
FIG. 3 is a schematic diagram of a functional configuration of a learning-region extracting unit shown in FIG. 2.

FIG. 3 is a block diagram of a functional configuration of the learning-region extracting unit 14. The learning-region extracting unit 14 includes a first-segment input section 141, a region setting section 142, a similarity calculating section 143, a region-score acquiring section 144, and a learning-region output section 145.

The first-segment input section 141 is a function section that receives, from the first-acoustic-model creating unit 13, an input including the first acoustic models and specific information of the first segments used to create the first acoustic models.

The region setting section 142 sequentially gathers a certain number of the first segments, which are successively received from the first-segment input section 141, into one region.

The similarity calculating section 143 calculates similarities between the speech features in two first segments of all possible combinations selected from among the first segments included in the regions set by the region setting section 142.

The region-score acquiring section 144 calculates, based on time information (time length) of each region set by the region setting section 142 and similarities calculated by the similarity calculating section 143, a region score indicating a probability that speech models included in the region are made by a single speaker.

From among region scores calculated by the region-score acquiring section 144, the learning-region output section 145 extracts, as a learning region, a region having the maximum score. The learning-region output section 145 then outputs to the second-acoustic-model creating section 15 the extracted learning region and specific information of the extracted learning region (speech features and time information of the region).

Figure 4:
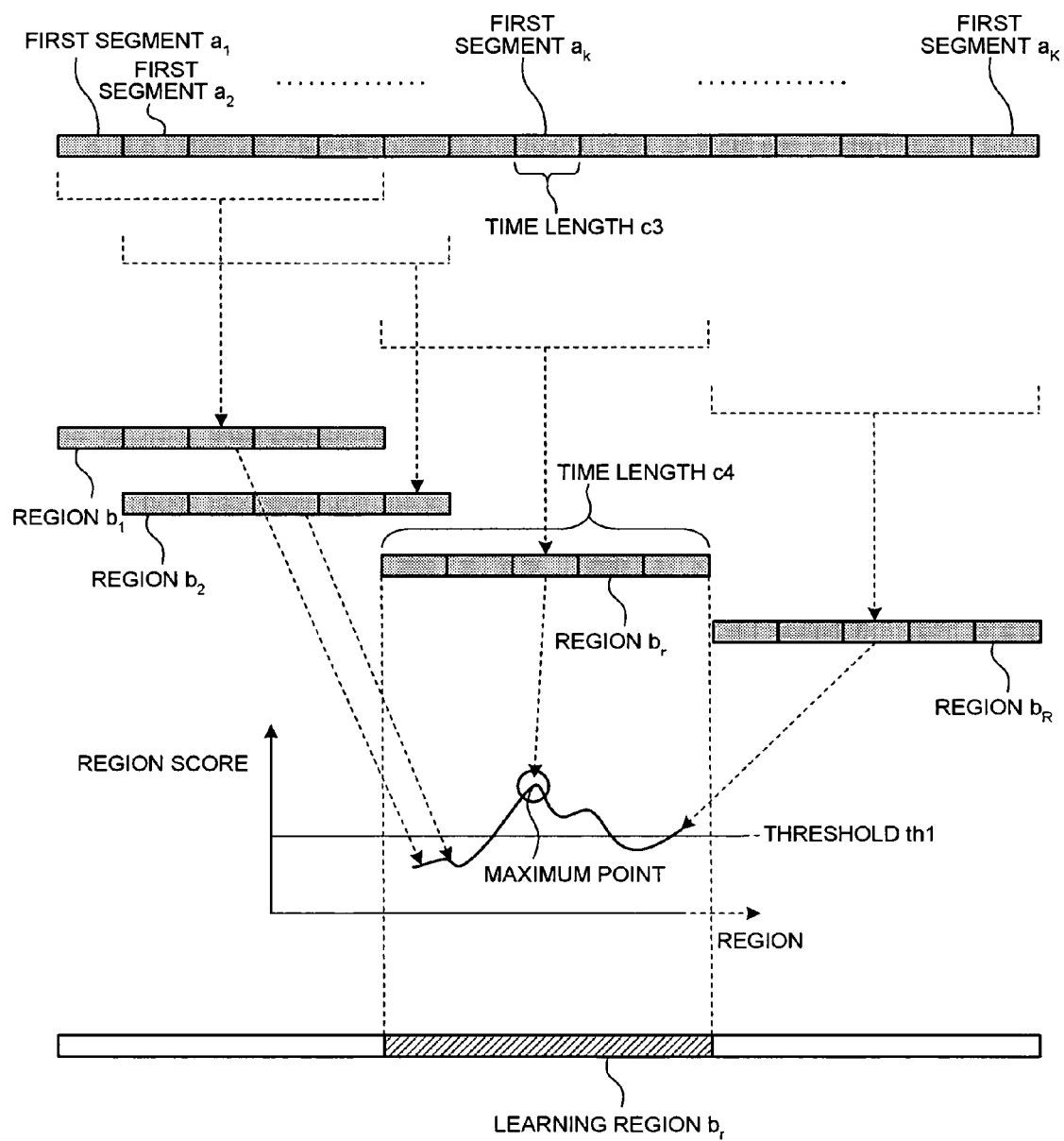
FIG. 4 is a schematic diagram of an example of the operations performed by the learning-region extracting unit shown in FIG. 3.

The operations performed by the learning-region extracting unit 14 will be described here in detail. FIG. 4 is a schematic diagram for explaining an example of the operations performed by the learning-region extracting unit 14, and FIG. 5 is a flowchart of a learning-region extracting process performed by the learning-region extracting unit 14.

Figure 5:
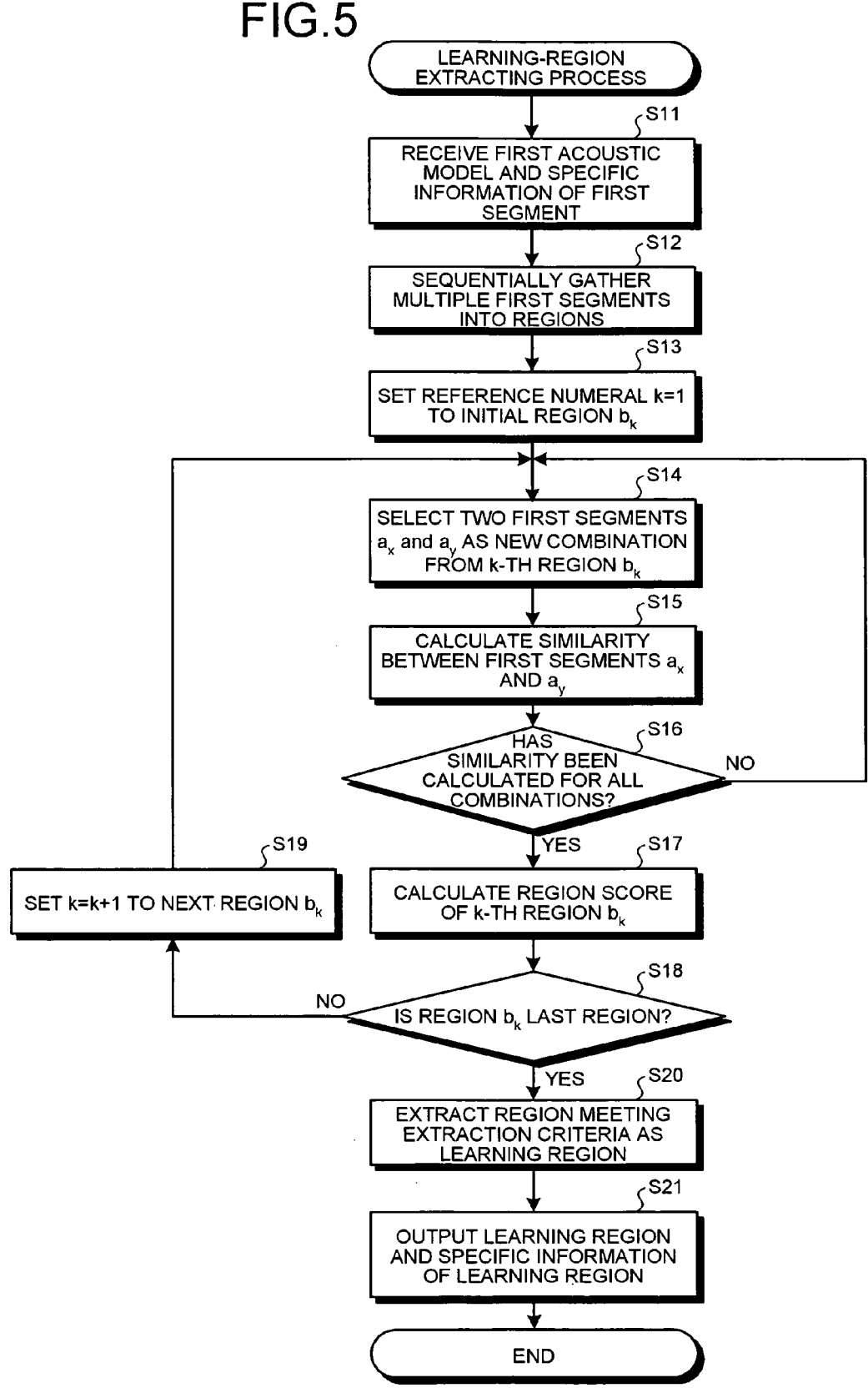
FIG. 5 is a flowchart of the operations performed by the learning-region extracting unit shown in FIG. 3.

To begin with, as shown in FIG. 5, the first-segment input section 141 receives a first acoustic model and specific information of the first acoustic model (Step S11). As shown in FIG. 4, the first acoustic model includes a plurality of first segments $a_1$ to $a_K$ each of time length c3. Subsequently, the region setting section 142 sequentially gathers a plurality of the first segments in one region thereby gathering all the first segments of the first acoustic model into a plurality of regions. Specifically, as shown in FIG. 4, the region setting section 142 sequentially gathers the first segments into regions $b_1$ to $b_R$ each having a time length c4 (Step S12). As shown in FIG. 4, some first segments of adjoining two or more regions can overlap. The time length c4 is set empirically. For example, each region may be set to have a time length c4 of 10.0 seconds because one speaker often continues to speak for about 10.0 seconds in conversation. Thus, if each of the first segments has a time length of 2.0 seconds, then five first segments can be gathered into one region.

Subsequently, the similarity calculating section 143 sets 1 for reference numeral k used to count a region being processed (Step S13), and then selects two first segments $a_x$ and $a_y$ included in the k-th region (initial region is k=1) (Step S14).

The similarity calculating section 143 calculates a similarity $S(a_x, a_y)$ between the first segments $a_x$ and $a_y$ (Step S15). Concretely, if the VQ codebook is used for the acoustic models created by the first-acoustic-model creating unit 13, the similarity calculating section 143 first calculates vector quantization distortion $D_y(a_x)$ and vector quantization distortion $D_x(a_y)$, and then calculates the similarity $S(a_x, a_y)$. Concretely, the vector quantization distortion $D_y(a_x)$ is calculated by using Equation (1) with respect to a code vector of the first segment $a_y$ by using the speech features of the first segment $a_x$. Similarly, the vector quantization distortion $D_x(a_y)$ is calculated with respect to a code vector of the first segment $a_x$ by using the speech features of the first segment $a_y$. Finally, the similarity $S(a_x, a_y)$ is obtained by giving a minus sign to a mean of the distortion $D_y(a_x)$ and $D_x(a_y)$ as shown by Equation (2).

$$S(a_x, a_y) = -\frac{D^y(a_x) + D^x(a_y)}{2} \tag{1}$$

$$D^y(a_x) = \frac{1}{M}\sum_{i=1}^{M} \min_{1\leq j\leq M} d(f_i^x, C^y(j)) \tag{2}$$

In Equation (2), d(x, y) is Euclidean distance of the vectors x and y, $C^y$ is a codebook of the segment $a_y$, $C^y(i)$ is the i-th code vector, M is the size of the codebook, and fix is the i-th speech feature of the first segment $a_x$. The higher the similarity $S(a_x, a_y)$ is, the smaller the vector quantization distortion between the first segments $a_x$ and $a_y$ is, allowing an assumption that the utterance is made by the same speaker highly likely.

The similarity calculating section 143 determines whether the processes at Steps 14 to 15 have been performed on all the first segments included in the region being processed, i.e., whether a similarity of two first segments of all combinations has been calculated (Step S16). If the similarity has not been calculated for all the combinations (No at Step S16), the system goes back to Step S14 and a similarity between first segments of a new combination is calculated.

On the contrary, at Step S16, if the similarity has been calculated for all the combinations (Yes at Step S16), the region-score acquiring section 144 calculates a region score of the k-th region being processed (Step S17). The region score indicates a probability that utterances are made by the same speaker. For example, the region score may be the minimum similarity among the acquired similarities.

The region-score acquiring section 144 determines whether the k-th region currently being processed is the last region. If the k-th region is not the last one (No at Step S18), the region-score acquiring section 144 increments the reference numeral k by 1 (k=k+1), thereby setting the next region to be processed (Step S19). Accordingly, the system control goes back to Step S14.

On the contrary, at Step S18, if the region currently being processed is the last region (Yes at Step S18), the learning-region output section 145 extracts, as a learning region, a region that meets a specific extraction criteria (Step S20). The learning-region output section 145 then outputs to the second-acoustic-model creating unit 15 the extracted learning region and specific information of the learning region (speech features and time information of the region) (Step S21), and terminates the procedure.

Preferably, the extraction criteria used at Step S20 include extracting a region that has the maximum similarity which is found is equal to or greater than the threshold th1. This is because near the region having the maximum similarity, utterances are most likely made by the same speaker. Further, with a similarity of equal to or greater than the threshold th1, the criteria for determining that utterances are made by the same speaker can be met. In this case, the threshold th1 may be set empirically or may be, for example, a mean of the similarities of all the regions. Alternatively, to ensure extraction of multiple regions, one or more regions may be extracted in a certain time interval.

It is possible to use different time lengths c4 for different regions. Specifically, the extraction may be arranged such that several patterns are applied to the time lengths c4 and all the regions of which scores have been calculated are subjected to the extracting process, regardless of the patterns. It has been known from experience that some speeches are long while some are short. To facilitate extraction of a region having a long time length c4 or a region having a short time length c4, values set for the time lengths c4 are preferably taken into consideration along with the acquired similarities. In the example shown in FIG. 4, a region $b_r$ has been extracted.

Referring back to FIG. 2, the second-acoustic-model creating unit 15 creates, for each learning region extracted by the learning-region extracting unit 14, an acoustic model i.e., a second acoustic model, based on the speech features of the region. The second-acoustic-model creating unit 15 then outputs the created second acoustic model to the feature-vector acquiring unit 16. To acquire the second acoustic model, the Gaussian mixture model (GMM) is preferably used because the time length c4 of one region is longer than the time length c3 of one first segment.

The feature-vector acquiring unit 16 uses the second acoustic model of each region, which it has received from the second-acoustic-model creating unit 15, and speech features corresponding to second segments (described later) included in the speech features, which it has received from the speech-feature extracting unit 11, to acquire a feature vector specific to each second segment. Further, the feature-vector acquiring unit 16 outputs to the clustering unit 17 the acquired feature vector of each second segment and time information of the second segment, as specific information of the second segment.

Figure 6:
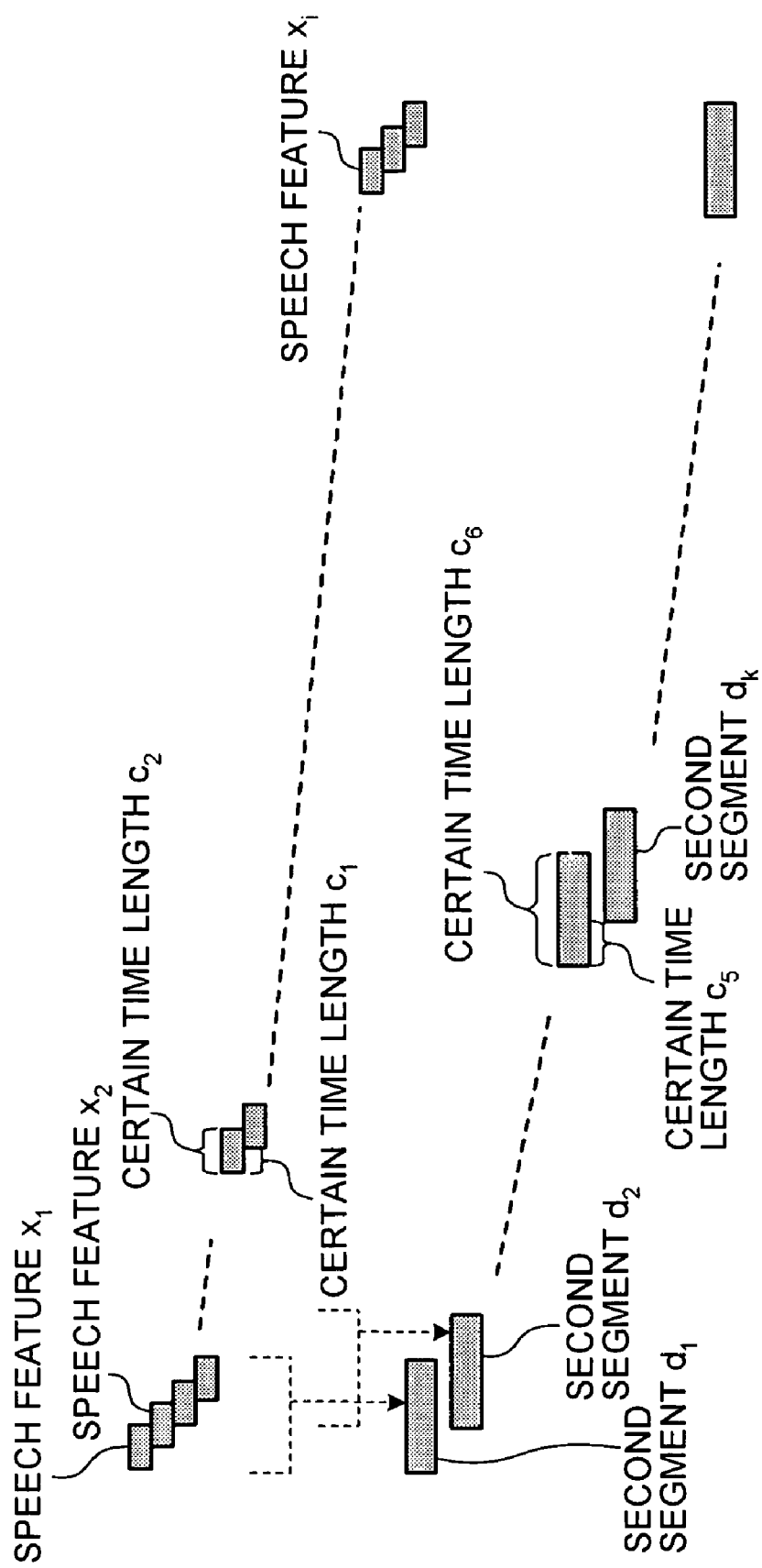
FIG. 6 is a schematic diagram of an example of the operations performed by a feature-vector acquiring unit shown in FIG. 2.
Figure 7:
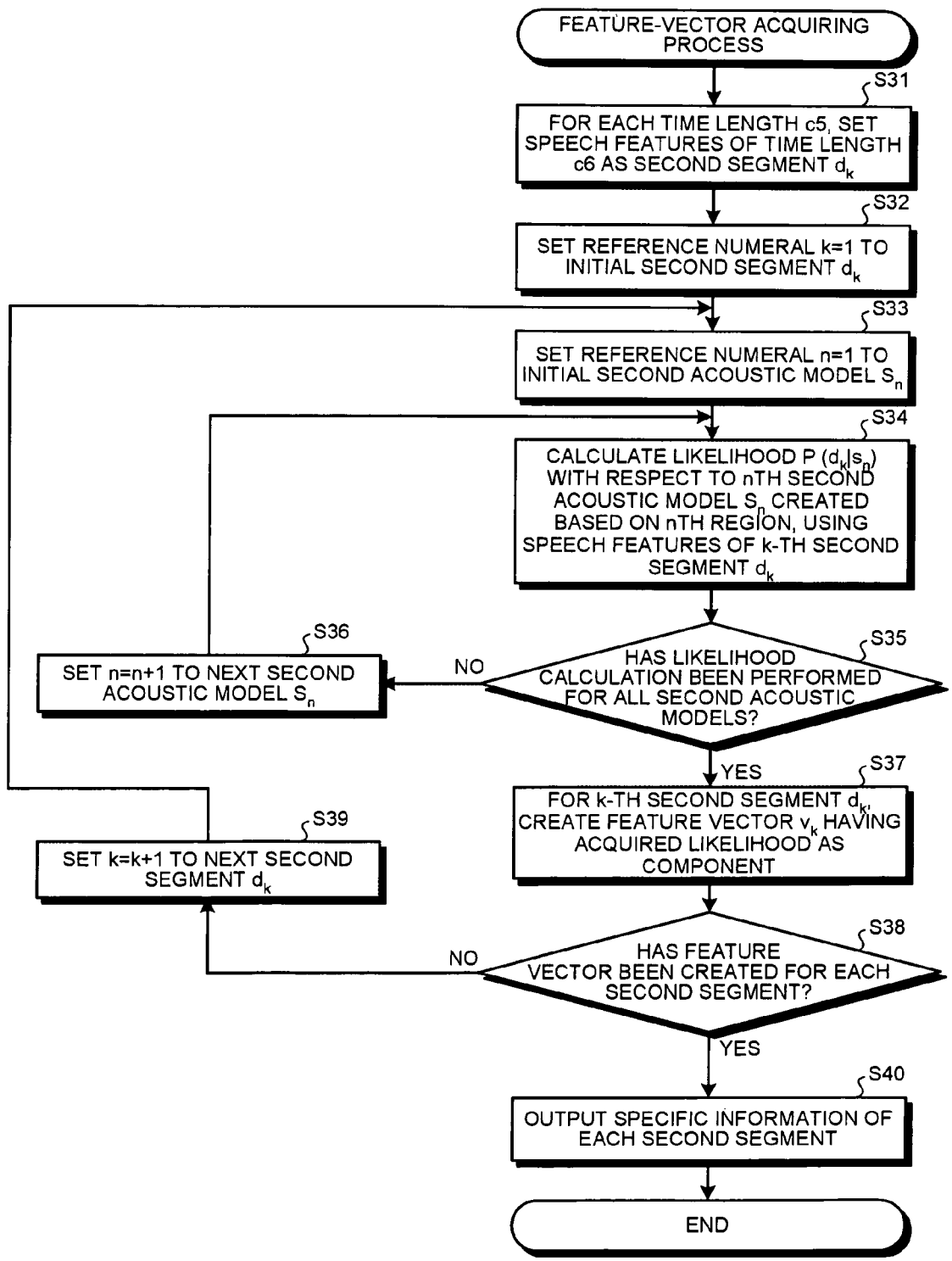
FIG. 7 is a flowchart of the operations performed by the feature-vector acquiring unit shown in FIG. 2.

The operations performed by the feature-vector acquiring unit 16 are described here in detail. FIG. 6 is a schematic diagram for explaining an example of the operations performed by the feature-vector acquiring unit 16, and FIG. 7 is a flowchart of a feature-vector acquiring process performed by the feature-vector acquiring unit 16.

As shown in FIG. 6, the feature-vector acquiring unit 16 establishes, for each time length c5, a second segment $d_k$ having speech features with a time length c6 (Step S31). The time lengths c5 and c6 may be set to be, for example, 0.5 seconds and 3.0 seconds, respectively. Note that, the time length c5 can be equal to or less than the time length c6. Further, the time length c6 is equal to or less than the time length c4 and substantially the same as the time length c3.

Further, the feature-vector acquiring unit 16 sets the initial second segment $d_k$ to have a reference numeral k=1 (Step S32). From among second acoustic models $s_n$ received from the second-acoustic-model creating unit 15, the feature-vector acquiring unit 16 sets the initial second acoustic model $s_n$ to have a reference numeral n=1 (Step S33).

The feature-vector acquiring unit 16 calculates a likelihood $P(d_k|s_n)$ with respect to the n-th second acoustic model $s_n$, using the speech features of the k-th second segment $d_k$ (Step S34). When the GMM is used to create the second acoustic model $s_n$, the likelihood is expressed by Equation (3):

$$P(d_k \mid S_n) = \qquad (3)$$

$$\frac{1}{I_k} \sum_{i=1}^{I_k} \sum_{m=1}^{M_n} c_{nm} \frac{1}{\sqrt{(2\pi)^{dim}|U_{nm}|}} \exp\left\{-\frac{1}{2}(f_i - u_{nm})^T U_{nm}(f_i - u_{nm})\right\}$$

where dim is the number of dimensions of the speech features; $I_k$ is the number of speech features of the second segment $d_k$; $F_i$ is the i-th speech feature of the second segment $d_k$; $m_n$ is the number of the mixed second acoustic models $s_n$; and $c_{nm}$, $u_{nm}$, and $U_{nm}$ respectively denote a weight factor, a mean vector, and a diagonal covariance matrix with respect to the number m of the mixed second acoustic models $s_n$.

Further, the feature-vector acquiring unit 16 determines whether the likelihood calculation has been performed at Step 34 for all the second acoustic models received from the second-acoustic-model creating unit 15 (Step S35). If the calculation has not been performed for some of the second acoustic models (No at Step S35), the feature-vector acquiring unit 16 sets the next second acoustic model to have a reference numeral n=n+1, thereby setting the next second acoustic model to be processed (Step S36). Accordingly, the system control goes back to Step S34.

On the contrary, at Step S35, if the likelihood calculation has been performed for all the second acoustic models (Yes at Step S35), the feature-vector acquiring unit 16 creates, for the k-th second segment $d_k$, a vector having the acquired likelihood as a component based on Equation (4):

$$v_k = \begin{pmatrix} P(d_k \mid s_1) \\ P(d_k \mid s_2) \\ \vdots \\ P(d_k \mid s_N) \end{pmatrix} \qquad (4)$$

Specifically, the vector is created as a feature vector $v_k$ indicating the features of the second segment (step S37). In Equation (4), the number of the second acoustic models is N. The feature vector $v_k$ may be processed such that its components are normalized.

Further, the feature-vector acquiring unit 16 determines whether a feature vector has been created for each of the second segments (Step S38). If a feature vector has not been created for each of the second segments (No at Step S38), the feature-vector acquiring unit 16 sets the next second segment to have a reference numeral k=k+1, thereby setting the next second segment to be processed (Step S39). Accordingly, the system control goes back to Step S33.

On the contrary, at Step S38, if a feature vector has been created for each of the second segments (Yes at Step S38), the feature-vector acquiring unit 16 outputs to the clustering unit 17 specific information (feature vector and time information) of each of the second segments (Step S40), and terminates the procedure.

Referring back to FIG. 2, the clustering unit 17 groups similar feature vectors out of the feature vectors of all the second segments received from the feature-vector acquiring unit 16 into a class. Further, the clustering unit 17 allocates the same ID (class number) to the second segments corresponding to the feature vectors that belonging to one class. The ID allows handling of the segments as being made by the same speaker. The clustering unit 17 then outputs time information and ID of each second segment to the indexing unit 18. As to whether the feature vectors are similar to each other, determination may be performed regarding, for example, whether a distortion due to the Euclidean distance is small. Further, as an algorithm used for grouping, for example, commonly known k-means may be used.

Based on the time information and IDs of the second segments received from the clustering unit 17, the indexing unit 18 divides the speech signals according to groups of second segments having the same IDs, i.e., by speakers. Further, the indexing unit 18 allocates a label (index) to each of the speech signals. Such a label indicates speaker information of each speaker.

Figure 8A:
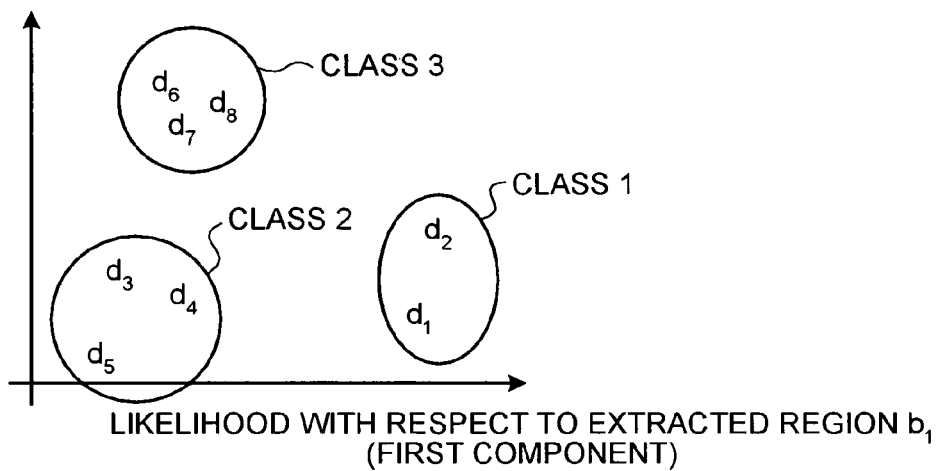
FIG. 8A is a graph for explaining the operations performed by an indexing unit shown in FIG. 2.
Figure 8B:
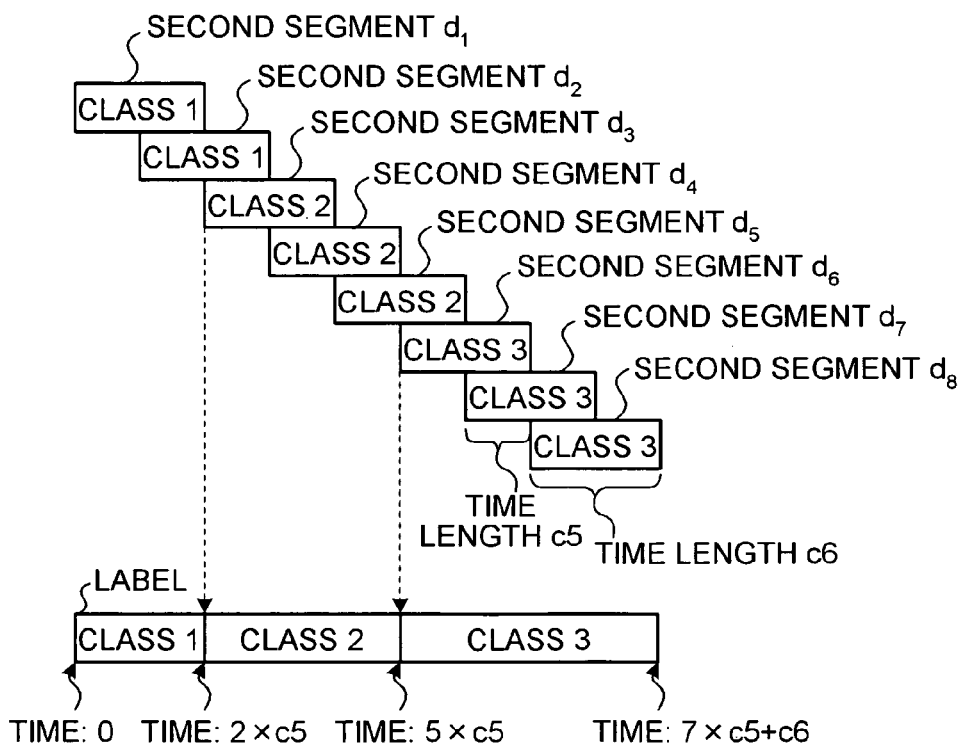
FIG. 8B is a schematic view for explaining the operations performed by the indexing unit shown in FIG. 2.

FIGS. 8A and 8B are schematic drawings for explaining the operations performed by the indexing unit 18. When the clustering unit 17 groups the second segments each having two components (likelihoods) as feature vectors into three classes as shown in FIG. 8A, the indexing unit 18 provides the second segments falling within a time period from 0 to 2×c5 with a label Class 1, the second segments falling within a time period from 2×c5 to 5×c5 with a label Class 2, and the second segments falling within a time period from 5×c5 to 7×c5+c6 with a label Class 3 as shown in FIG. 8B.

The second segments being close to each other may overlap depending on the value set for the time length c5. In this case, assuming that, for example, a second segment being closer to a mean of the class achieves higher reliability, a result indicating higher reliability may preferably be used. In the example shown in FIG. 8B, the second segment $d_3$ is determined more reliable than the second segment $d_2$, and the second segment $d_6$ is determined more reliable than the second segment $d_5$. Further, a portion having more than one result may further be divided into new segments each having a shorter time length c7, and feature vectors are found for the new segments thus divided. These feature vectors may be used to find a class to which each new segment belongs, and time for each segment.

Figure 9:
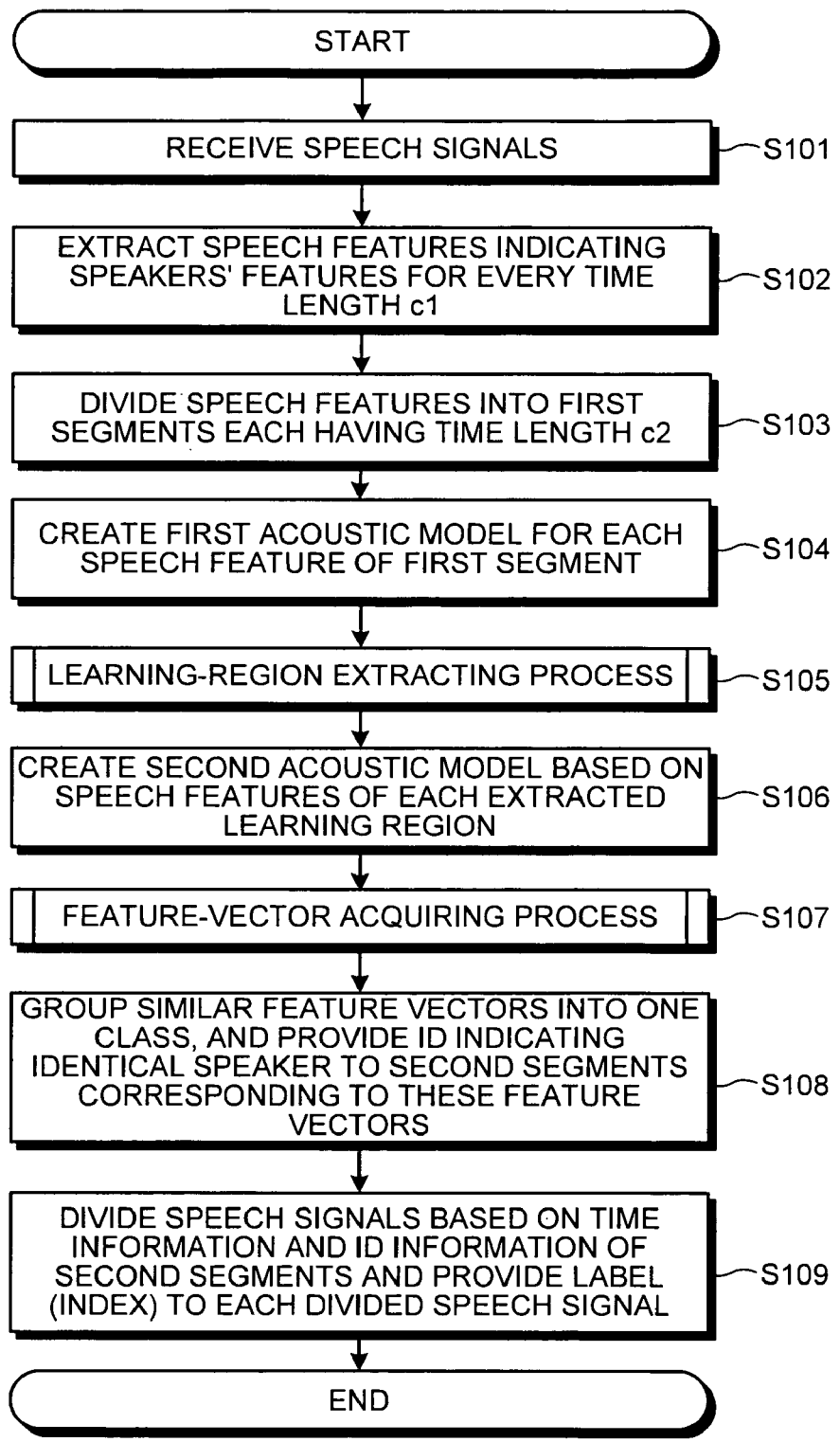
FIG. 9 is a flowchart of an indexing process performed by the indexing apparatus shown in FIG. 2.

FIG. 9 is a flowchart of an indexing process performed by the indexing apparatus 100. To begin with, speech signals are received via the speech input unit 106 (Step S101). The speech-feature extracting unit 11 extracts speech features indicating speakers' features, in a certain interval of the time length c1, from the received speech signals (Step S102), and outputs the extracted speech features to the speech-feature dividing unit 12 and the feature-vector acquiring unit 16.

The speech-feature dividing unit 12 divides the received speech features into first segments each having a predetermined interval of the time length c3 (Step S103). Then, speech features and time information of each of the first segments are output to the first-acoustic-model creating unit 13.

The first-acoustic-model creating unit 13, every time when it receives the speech features of a first segment, creates an acoustic model based on the speech features (Step S104). The created acoustic model together with specific information (speech features and time information) of the first segment used to create the acoustic model is output from the first-acoustic-model creating unit 13 to the learning-region extracting unit 14.

At the subsequent step S105, the learning-region extracting unit 14 performs a learning-region extracting process (see FIG. 5), based on the acoustic models created at Step S104 and specific information of the first segments of the acoustic models. The learning-region extracting unit 14 then extracts, as a learning region, a region where utterances are highly likely made by an identical speaker (Step S105). The extracted learning region together with the specific information of the learning region (speech features and time information of the relevant region) is output from the learning-region extracting unit 14 to the second-acoustic-model creating unit 15.

The second-acoustic-model creating unit 15 creates, for each learning region extracted at Step S105, a second acoustic model based on the speech features of the region (Step S106). The created second acoustic model is then output from the second-acoustic-model creating unit 15 to the feature-vector acquiring unit 16.

At the subsequent step S107, the feature-vector acquiring unit 16 performs the feature-vector acquiring process (see FIG. 7), based on the second acoustic models created at Step S106 and the speech features of the second segments. Accordingly, the feature-vector acquiring unit 16 acquires specific information (feature vectors and time information) of the second segments in the feature-vector acquiring process (Step S107). The acquired specific information is output from the feature-vector acquiring unit 16 to the clustering unit 17.

From among all the feature vectors obtained at Step S107, the clustering unit 17 groups similar feature vectors into a class. Further, the clustering unit 17 provides second segments corresponding to the feature vectors included in the class with a specific ID allowing handling of the segments as being made by an identical speaker (Step S108). Then, the time information (start time and end time) and ID of each of the second segments are output from the clustering unit 17 to the indexing unit 18.

The indexing unit 18 divides the speech signals received at Step S101, based on the time information of the second segments and IDs given to the second segments. Further, the indexing unit 18 provides each of the divided speech signals with a relevant label (index) (Step S109), and terminates the procedure.

As described, according to the present embodiment, a time period during which speech signals are generated by utterances of a single speaker is used to create acoustic models. This method reduces a possibility that acoustic models are created in a time period during which utterances of multiple speakers are mixed, and eliminates difficulties in discriminating utterances of different speakers, thereby improving accuracy in creating acoustic models, i.e., indexing. Further, by using divided segments to create one acoustic model, a larger amount of information can be included in one model, compared with conventional methods. Thus, more accurate indexing is realized.

An indexing apparatus 200 according to a second embodiment of the present invention will be described here. Constituting elements identical to those described in the first embodiment are indicated by the same reference numerals, and their description is omitted. Further, the indexing apparatus 200 has the same hardware structure as shown in FIG. 1.

Figure 10:
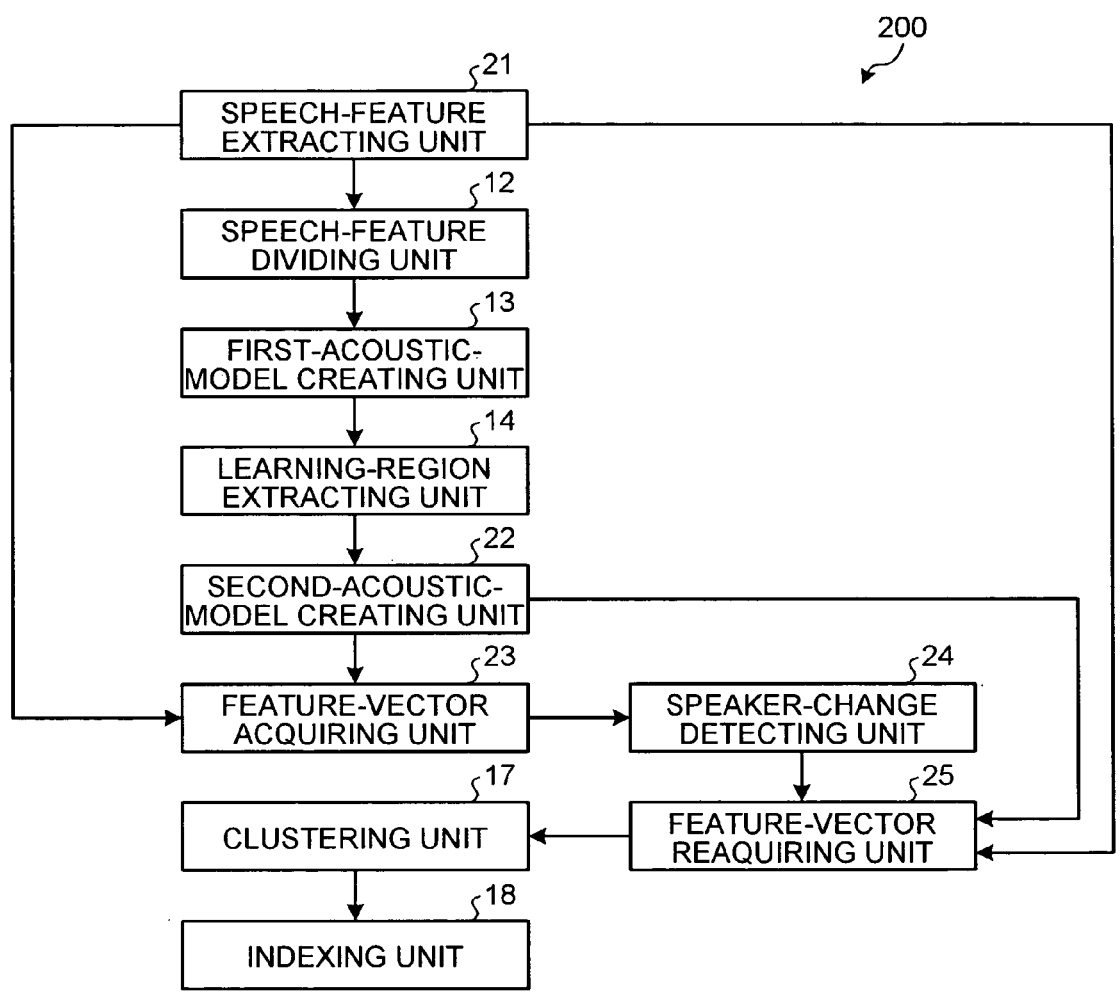
FIG. 10 is a schematic view of a functional configuration of an indexing apparatus according to a second embodiment of the present invention.

FIG. 10 is a block diagram of functional configuration of the indexing apparatus 200 according to the second embodiment. The indexing apparatus 200 includes a speech-feature extracting unit 21, the speech-feature dividing unit 12, the first-acoustic-model creating unit 13, the learning-region extracting unit 14, a second-acoustic-model creating unit 22, a feature-vector acquiring unit 23, a speaker-change detecting unit 24, a feature-vector reacquiring unit 25, the clustering unit 17, and the indexing unit 18.

The speech-feature extracting unit 21, the second-acoustic-model creating unit 22, the feature-vector acquiring unit 23, the speaker-change detecting unit 24, and the feature-vector reacquiring unit 25 are functional units realized in cooperation with predetermined computer programs previously stored in the CPU 101 and the ROM 104, like the speech-feature dividing unit 12, the first-acoustic-model creating unit 13, the learning-region extracting unit 14, the clustering unit 17, and the indexing unit 18.

The speech-feature extracting unit 21 extracts speech features, and outputs them to the feature-vector reacquiring unit 25, the speech-feature dividing unit 12, and the feature-vector acquiring unit 23. The second-acoustic-model creating unit 22 creates an acoustic model for each region, and outputs it to the feature-vector reacquiring unit 25 and the feature-vector acquiring unit 23. The feature-vector acquiring unit 23 outputs to the speaker-change detecting unit 24 specific information (feature vector and time information) of each second segment.

The speaker-change detecting unit 24 calculates a similarity of adjacent second segments based on their feature vectors, detects a time point when the speaker is changed, and then outputs information of the detected time to the feature-vector reacquiring unit 25.

Figure 11:
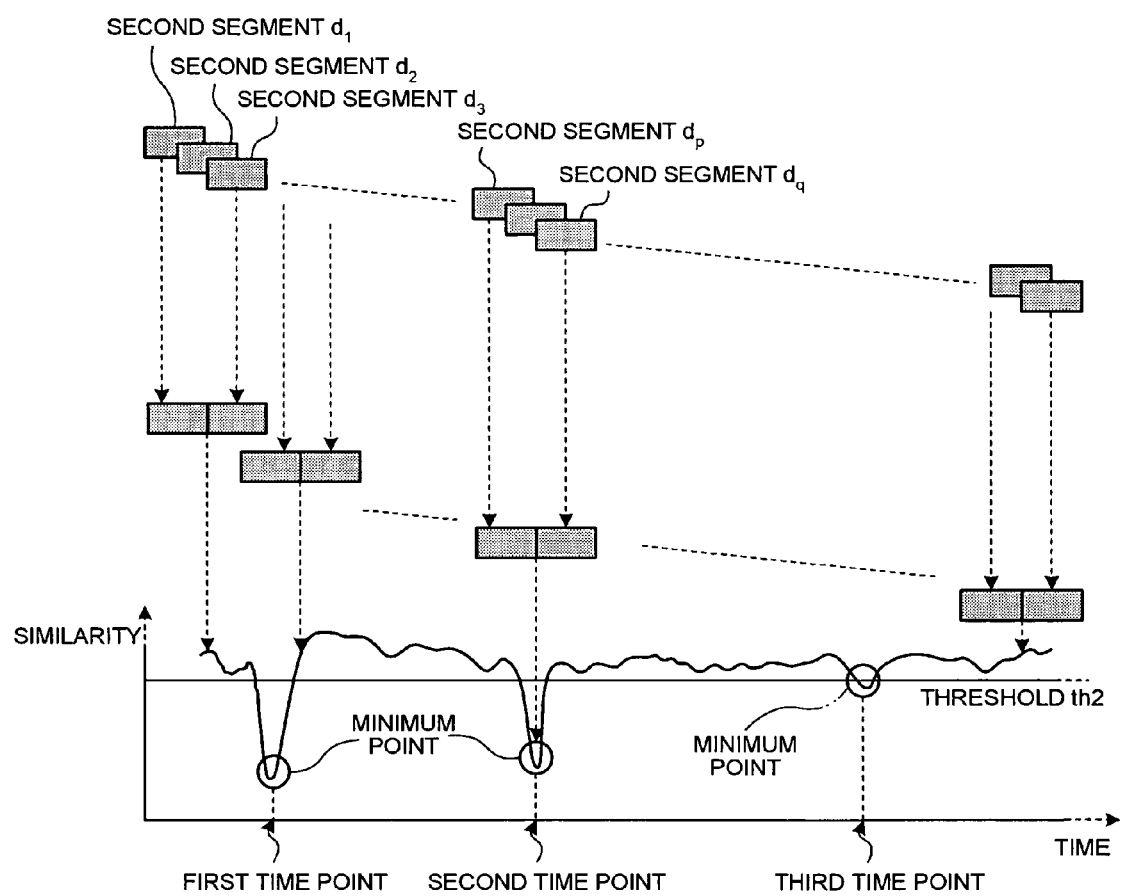
FIG. 11 is a schematic view of an example of the operations performed by a speaker-change detecting unit shown in FIG. 10.
Figure 12:
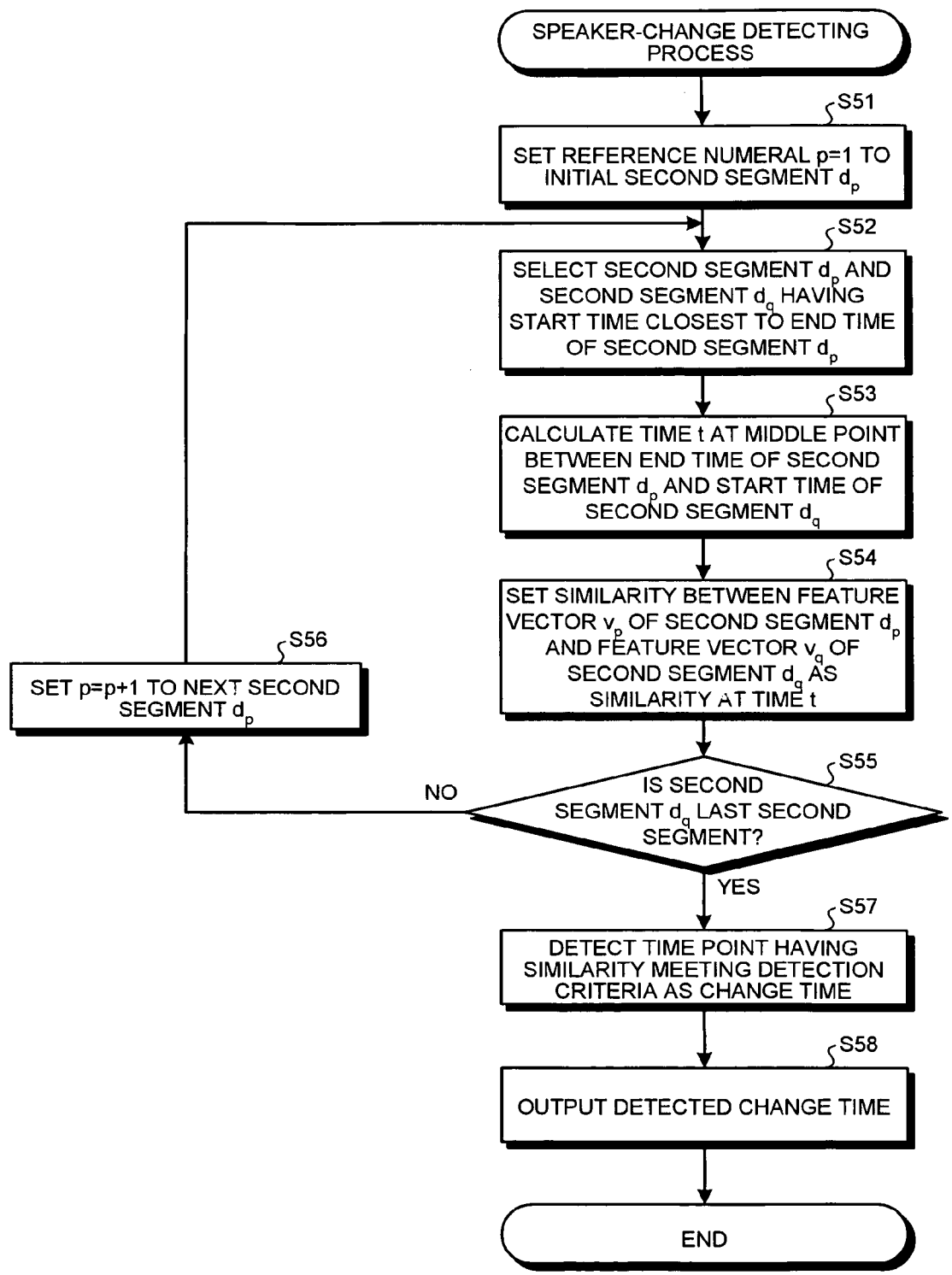
FIG. 12 is a flowchart of the operations performed by the speaker-change detecting unit shown in FIG. 10.

The operations performed by the speaker-change detecting unit 24 are described here in detail. FIG. 11 is a schematic drawing for explaining an example of the operations performed by the speaker-change detecting unit 24, and FIG. 12 is a flowchart of a speaker-change detecting process performed by the speaker-change detecting unit 24.

To begin with, the speaker-change detecting unit 24 sets a reference numeral p=1 to specific information of the initial second segment received from the feature-vector acquiring unit 23 (Step S51). Specific information of a second segment is referred to as a second segment $d_p$.

As shown in FIG. 11, the speaker-change detecting unit 24 selects a second segment $d_p$ and a second segment $d_q$ having a start time closest to the end time of the second segment $d_p$ (Step S52). This process allows for selection of the second segments $d_p$ and a second segment adjacent to the second segment $d_p$. When the time length c6 is set to be a constant multiple of the time length c5, the end time of the second segment $d_p$ matches the start time of the second segment $d_q$.

The speaker-change detecting unit 24 calculates a time t that lies at the middle point between the end time of the second segment $d_p$ and the start time of the second segment $d_q$ (Step S53). The speaker-change detecting unit 24 then calculates a similarity between a feature vector $v_p$ of the second segment $d_p$ and a feature vector $v_q$ of the second segment $d_q$, and sets it as the similarity at the time t (Step S54). The similarity may be obtained by, for example, giving a minus sign to a Euclidean distance.

The speaker-change detecting unit 24 determines whether the second segment $d_q$ being processed is the last one of all the second segments received from the feature-vector acquiring unit 23 (Step S55). If the second segment $d_q$ being processed is not the last one (No at Step S55), the speaker-change detecting unit 24 increments the reference numeral p by 1 (p=p+1), thereby setting the next second segment to be processed (Step S56). Accordingly, the system control goes back to Step S52.

On the contrary, at Step S55, if the second segment $d_q$ being processed is the last second segment (Yes at Step S55), the speaker-change detecting unit 24 detects a time point at which a similarity is found that meets the detection criteria for determining whether the speaker is changed at that time point. Specifically, the speaker-change detecting unit 24 detects the time point as a point when the speaker has changed (change time) (Step S57). The speaker-change detecting unit 24 then outputs the detected change time to the feature-vector reacquiring unit 25 (Step S58), and terminates the procedure.

Preferably, the detection criteria include detecting a time point at which the minimum similarity which is found is equal to or less than the threshold th2. This is because the speaker has most likely changed near the time point at which the minimum similarity is found. Further, with a similarity of equal to or less than the threshold th2, the criteria for determining that compared second segments are utterances made by different speakers can be met. The threshold th2 may be set empirically. In the example shown in FIG. 11, the result shows that three time points are detected at which the speakers have changed.

Referring back to FIG. 10, the feature-vector reacquiring unit 25 divides the speech features received from the speech-feature extracting unit 21 by using the change time received from the speaker-change detecting unit 24. The feature-vector reacquiring unit 25 performs the process as performed by the feature-vector acquiring unit 23 by using, for example, acoustic models received from the second-acoustic-model creating unit 22, so as to acquire feature vectors of third segments obtained by dividing the speech features. The feature-vector reacquiring unit 25 then outputs to the clustering unit 17 specific information (feature vectors and time information) of the third segments.

The feature vectors may be calculated in a different manner from the one performed by the feature-vector acquiring unit 23. For example, if second segments are arranged in a way that their start time and end time are within the range from the start time to the end time of a third segment, a mean of the feature vectors of the arranged second segments may be set as the feature vector of the third segment.

Figure 13:
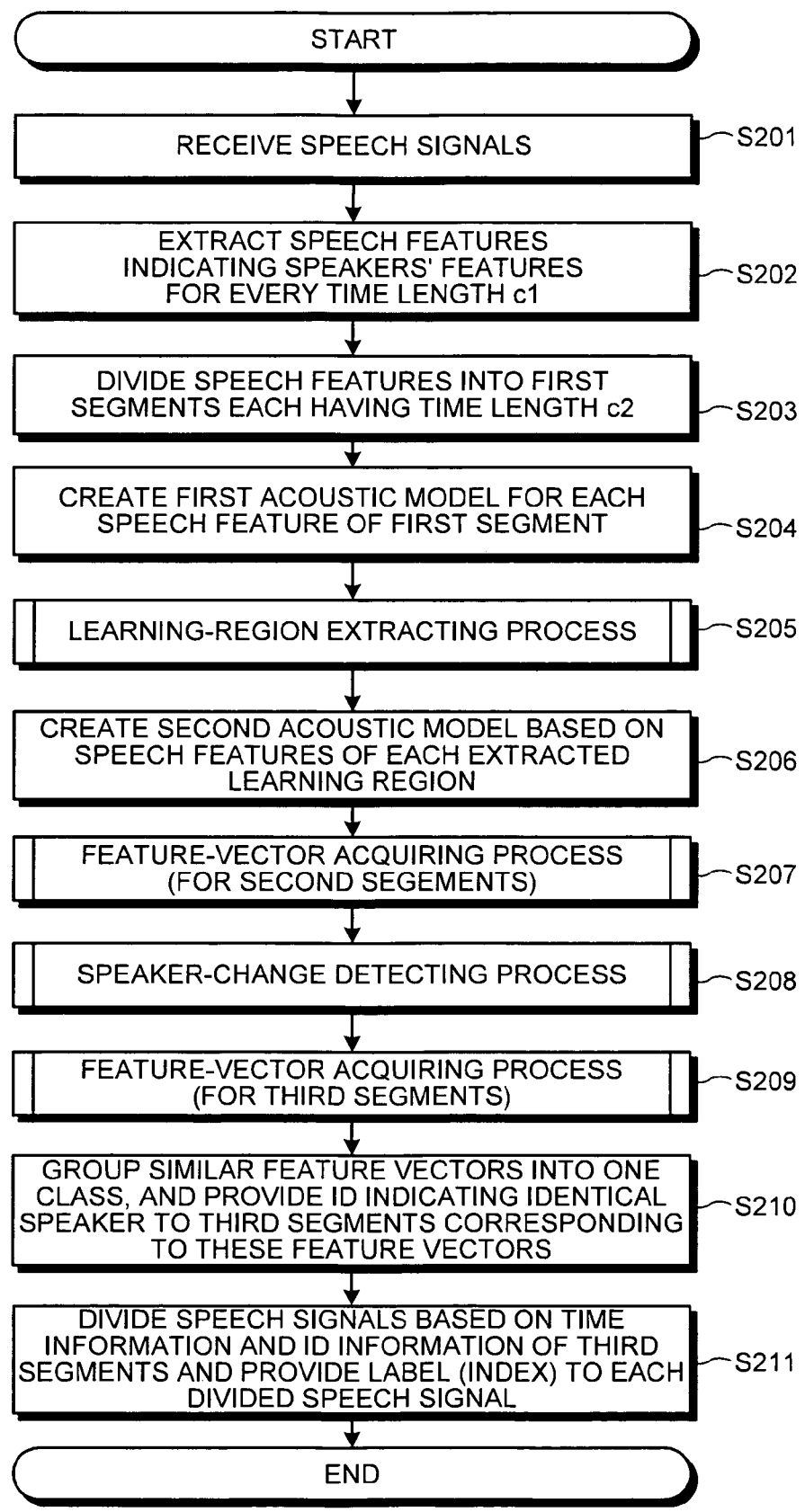
FIG. 13 is a flowchart of an indexing process performed by the indexing apparatus shown in FIG. 10.

FIG. 13 is a flowchart of an indexing process performed by the indexing apparatus 200. To begin with, speech signals are received via the speech input unit 106 (Step S201). The speech-feature extracting unit 21 extracts speech features indicating speakers' features, in a certain interval of the time length c1 from the received speech signals (Step S202). The extracted speech features are output from the speech-feature extracting unit 21 to the speech-feature dividing unit 12, the feature-vector acquiring unit 23, and the feature-vector reacquiring unit 25.

The speech-feature dividing unit 12 divides the speech features into first segments, and outputs to the first-acoustic-model creating unit 13 the speech features and time information (start time and end time) of each of the first segments (Step S203).

The first-acoustic-model creating unit 13 creates, for speech features of a first segment, an acoustic model based on the speech features of each first segment. The first-acoustic-model creating unit 13 then outputs to the learning-region extracting unit 14 the created acoustic model and specific information (speech features and time information) of each of the first segments used to create the acoustic model (Step S204).

At the subsequent step S205, the learning-region extracting unit 14 performs the learning-region extracting process (see FIG. 5), based on the received acoustic models and specific information of the first segments used to create the acoustic models. The learning-region extracting unit 14 then extracts, as a learning region, a region where utterances are highly likely made by an identical speaker (Step S205). The extracted learning region together with specific information of the learning region (speech features and time information of the relevant region) is output from the learning-region extracting unit 14 to the second-acoustic-model creating unit 22.

The second-acoustic-model creating unit 22 creates, for each learning region extracted at Step S205, a second acoustic model based on the speech features of the region (Step S206). The created second acoustic model is output from the secondacoustic-model creating unit 22 to the feature-vector acquiring unit 23 and the feature-vector reacquiring unit 25.

At the subsequent step S207, the feature-vector acquiring unit 23 performs the feature-vector acquiring process (see FIG. 7), based on the second acoustic models created at Step S206 and speech features of the second segments. Accordingly, the feature-vector acquiring unit 23 acquires specific information (feature vectors and time information) of the second segments in the feature-vector acquiring process (Step S207). The acquired specific information is output from the feature-vector acquiring unit 23 to the speaker-change detecting unit 24.

At Step S208, the speaker-change detecting unit 24 performs a speaker-change detecting process as described (see FIG. 12) based on the specific information of the second segments, which is acquired at Step S207. The speaker-change detecting unit 24 then outputs to the feature-vector reacquiring unit 25 a change time detected in the speaker-change detecting process (Step S208).

Subsequently, the feature-vector reacquiring unit 25 divides, based on the change time detected at Step S208, speech features of the time length c2, which are extracted at Step S202. Further, the feature-vector reacquiring unit 25 performs a similar process to the feature-vector acquiring process (see FIG. 7) based on the second acoustic models of the regions and the speech features of the relevant second segments, so as to acquire specific information of the third segments (Step S209). The acquired specific information is output from the feature-vector reacquiring unit 25 to the clustering unit 17.

From among the feature vectors acquired at Step S209 for all the third segments, the clustering unit 17 groups similar feature vectors into one class. The clustering unit 17 then provides third segments corresponding to the feature vectors included in one class with a specific ID allowing handling of the segments as being made by an identical speaker (Step S210). The time information (start time and end time) and ID of each of the third segments are output from the clustering unit 17 to the indexing unit 18.

The indexing unit 18 divides the speech signals based on the received time information and IDs of the third segments, provides each of the divided speech signals with a relevant label (index) (Step S211), and then terminates the process.

As described, the second embodiment yields the following advantages in addition to the advantage achieved in the first embodiment. In the second embodiment, the speaker-change detecting unit 24 is incorporated and estimation is made for a time when the speaker is changed. This structure enables more accurate identification of an interface between different labels output from the indexing unit 18. Further, segments divided by each change time are subjected to clustering. Accordingly, the clustering can be performed on segments for a longer time length than the time length c6 of a second segment. This arrangement enables highly reliable featuring based on a larger amount of information, thereby realizing highly accurate indexing.

While two specific embodiments of the present invention have been described above, the present invention is not limited to those embodiment. In other words, it can be modified, changed, and added with other features in various ways without departing from the sprit and scope of the present invention.

In the foregoing embodiments, computer programs executable by a user interface system are previously installed in the ROM 14, the memory unit 17, or the like. However, such programs can be recorded in other computer-readable recording media such as compact disk read only memories (CD-ROM), flexible disks (FD), compact disk readable (CD-R) disks, or digital versatile disks (DVD) in an installable or executable file format. Further, these computer programs can be stored in a computer connected to the Internet and other networks, so as to be downloaded via the network, or may be provided or distributed via networks such as the Internet.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An indexing apparatus comprising a processing unit and including:
    an extracting unit configured to extract in a certain time interval, from among speech signals including utterances of a plurality of speakers, speech features indicating features of the speakers;
    a first dividing unit configured to divide the speech features into a plurality of first segments each having a certain first time length;
    a first-acoustic-model creating unit configured to create a first acoustic model for each of the first segments based on the speech features included in the first segments;
    a similarity calculating unit configured to sequentially group a certain number of temporally successive first segments into a region, and calculate a similarity between the first segments based on first acoustic models of the first segments included in the region;
    a region extracting unit configured to extract a region having a similarity that is equal to or greater than a predetermined value as a learning region;
    a second-acoustic-model creating unit configured to create, for the learning region, a second acoustic model based on speech features included in the learning region;
    a second dividing unit configured to divide the speech features into second segments each having a predetermined second time length;
    a feature-vector acquiring unit configured to acquire feature vectors specific to the respective second segments, using the second acoustic model of the learning region and speech features of the second segments;
    a clustering unit configured to group speech features of the second segments corresponding to the feature vectors, based on vector components of the feature vectors; and
    an indexing unit configured to allocate, based on a result of grouping performed by the clustering unit, relevant portions of the speech signals with speaker information including information for grouping the speakers,
    wherein at least the extracting unit and the first dividing unit are executed by the processing unit.

2. The indexing apparatus according to claim 1, wherein the region extracting unit calculates similarities of speech features in two first segments of all combinations selected from among the first segments included in the region and sets a similarity that meets a predetermined criterion to be a similarity of the region.

3. The indexing apparatus according to claim 2, wherein the region extracting unit sets, from among all the similarities calculated for the two first segments of all combinations, a minimum similarity to be the similarity of the region.

4. The indexing apparatus according to claim 1, wherein the region extracting unit extracts one or more regions.

5. The indexing apparatus according to claim 1, wherein the region extracting unit takes the number of the first segments included in the region or a value set for the first time length of each of the first segments into consideration along with the similarities.

6. The indexing apparatus according to claim 1, wherein the feature-vector acquiring unit acquires the feature vectors that have, as a vector component, information concerning the similarity of the region.

7. The indexing apparatus according to claim 1, wherein the first segments and the second segments are substantially equal in time length.

8. The indexing apparatus according to claim 1, further comprising:
- a change-time detecting unit configured to detect, based on the feature vectors, a change time when speakers have changed;
- a third dividing unit configured to divide the speech features into third segments each having a third time length defined by the change time; and
- a feature-vector reacquiring unit configured to acquire, using the speech features and the second acoustic model of the region, feature vectors of speech features for the respective third segments, wherein
- the clustering unit performs grouping using the feature vectors acquired by the feature-vector reacquiring unit.

9. The indexing apparatus according to claim 8, wherein the feature-vector reacquiring unit acquires the feature vectors that have, as a vector component, information concerning a similarity of the second acoustic model.

10. A method of indexing comprising:
- extracting in a certain time interval, from among speech signals including utterances of a plurality of speakers, speech features indicating features of the speakers;
- dividing the speech features into a plurality of first segments each having a certain first time length;
- creating a first acoustic model for each of the first segments based on the speech features included in the first segments;
- sequentially grouping a certain number of successive first segments into a region;
- calculating a similarity between the first segments based on first acoustic models of the first segments included in the region;
- extracting a region having a similarity that is equal to or greater than a predetermined value as a learning region;
- creating, for the learning region, a second acoustic model based on speech features included in the learning region;
- dividing the speech features into second segments each having a predetermined second time length;
- acquiring feature vectors specific to the respective second segments, using the second acoustic model of the learning region and speech features of the second segments;
- clustering speech features of the second segments corresponding to the feature vectors, based on vector components of the feature vectors; and
- allocating, based on a result of grouping performed at the clustering, relevant portions of the speech signals with speaker information including information for grouping the speakers.

11. A computer program product including a non-transitory computer readable medium including program instructions for generating a prosody pattern, wherein the instructions, when executed by a computer, cause the computer to perform:
- extracting in a certain time interval, from among speech signals including utterances of a plurality of speakers, speech features indicating features of the speakers;
- dividing the speech features into a plurality of first segments each having a certain first time length;
- creating a first acoustic model for each of the first segments based on the speech features included in the first segments;
- sequentially grouping a certain number of successive first segments into a region;
- calculating a similarity between the first segments based on first acoustic models of the first segments included in the region;
- extracting a region having a similarity that is equal to or greater than a predetermined value as a learning region;
- creating, for the learning region, a second acoustic model based on speech features included in the learning region;
- dividing the speech features into second segments each having a predetermined second time length;
- acquiring feature vectors specific to the respective second segments, using the second acoustic model of the learning region and speech features of the second segments;
- clustering speech features of the second segments corresponding to the feature vectors, based on vector components of the feature vectors; and
- allocating, based on a result of grouping performed at the clustering, relevant portions of the speech signals with speaker information including information for grouping the speakers.

* * * * *